US012794387B2

(12) United States Patent
Ghileb et al.

(10) Patent No.: US 12,794,387 B2
(45) Date of Patent: Nov. 10, 2026

(54) METHOD OF DETERMINING A MAXIMUM OPERATING SPEED OF AN ELECTRIC MOTOR

(71) Applicant: Schneider Toshiba Inverter Europe SAS, Pacy sur Eure (FR)

(72) Inventors: Haïthem Ghileb, Vernon (FR); Al Kassem Jebai, Vernon (FR); Emmanuel Frappé, Boulogne-Billancourt (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 182 days.

(21) Appl. No.: 18/937,413

(22) Filed: Nov. 5, 2024

(65) Prior Publication Data

US 2025/0211146 A1 Jun. 26, 2025

(30) Foreign Application Priority Data

Dec. 21, 2023 (EP) .................................... 23307299

(51) Int. Cl.

| | |
|---|---|
| ***H02P 21/14*** | (2016.01) |
| ***H02P 21/00*** | (2016.01) |
| ***H02P 21/18*** | (2016.01) |
| ***H02P 21/20*** | (2016.01) |
| *B66C 13/23* | (2006.01) |

(52) U.S. Cl.

CPC ...... *H02P 21/0085* (2013.01); *H02P 21/0003* (2013.01); *H02P 21/18* (2016.02); *H02P 21/20* (2016.02); *B66C 13/23* (2013.01)

(58) Field of Classification Search

CPC ...... H02P 21/0085; H02P 21/18; H02P 21/20; H02P 21/0003; H02P 23/0086; B66C 13/23

(Continued)

(56) References Cited

U.S. PATENT DOCUMENTS 9,768,719 B2 9/2017 Campbell et al.
9,776,640 B1 * 10/2017 Tian .................. B60W 50/0098

(Continued)

OTHER PUBLICATIONS

Siemens AG, "Simocrane, Drive-Based Technology, Operating Instructions", Nov. 2010, 92 pages.

(Continued)

*Primary Examiner* — Gabriel Agared
(74) *Attorney, Agent, or Firm* — FIG. 1 Patents

(57) ABSTRACT

A method that involves determining the maximum operating speed of an electric motor under varying torque conditions, specifically at speeds surpassing its rated speed. Initially, the motor is operated at its highest speed across different torque values, establishing a data set of real measurement points. These points illustrate the relationship between the maximum motor speed and the applied torque. A coefficient (COF), ranging from 0 to 1 and dependent on motor characteristics, is selected. Two curves are then established: the first for lower maximum speeds, represented by $$\Omega_{ref} = \frac{COFP_{nom}}{T_{meas}},$$

and the second for torques below a defined limit torque $T_{lim}$ expressed as $$\Omega_{ref} = \frac{COFP_{nom}}{f(T_{meas})},$$

where $f$ is a polynomial function derived from the measurement points. The appropriate curve is then used to ascertain (Continued)

the maximum motor speed for a given torque, based on whether the torque is greater or lesser than $T_{lim}$.

4 Claims, 3 Drawing Sheets

(58) Field of Classification Search
USPC .................................................... 318/400.02
See application file for complete search history.

(56) References Cited

U.S. PATENT DOCUMENTS

2005/0141887 A1* 6/2005 Lelkes .................... H02P 6/085
388/813
2007/0118308 A1* 5/2007 El-Ibiary ................. H02P 23/14
702/60
2017/0250628 A1* 8/2017 Tian ........................ H02P 21/14
2017/0346433 A1* 11/2017 Bazzi .................. H02P 23/0022
2020/0217548 A1* 7/2020 Yang ..................... F04D 27/007
2021/0207612 A1* 7/2021 Yang ..................... F04D 27/004

OTHER PUBLICATIONS

Salomaki, Janne et al., "Field-Weakening Method for V/f-Controlled Hoist Drive", 2011 IEEE International Electric Machines & Drives Conference (IEMDC), May 15, 2011, pp. 1253-1258.
European Search Report and Search Opinion dated Jun. 17, 2024 for corresponding European Patent Application No. EP23307299.0, 7 pages.

* cited by examiner

METHOD OF DETERMINING A MAXIMUM OPERATING SPEED OF AN ELECTRIC MOTOR

TECHNICAL FIELD

The present disclosure relates to a method of determining a maximum operating speed of an electric motor subjected to a defined torque at a speed higher than the rated speed of the motor. More particularly, the present disclosure relates to the field of high-speed hoisting.

PRIOR ART

Mechanical and electro-mechanical lifting equipment, including cranes and hoisting gear, must be able to lift loads at high speeds. This feature is particularly important in scenarios where time efficiency and rapid movement of materials are critical, such as in industrial environments or on construction sites. Traditional high-speed lifting systems rely heavily on electric motors to generate the power required for the lifting process. The performance of these motors, particularly their output at different speeds, plays a central role in the overall efficiency of the lifting system.

A motor manufacturer will normally provide information on the rated power and rated speed of the motor. This information is usually given on the motor nameplate.

Rated speed is the speed at which the motor or equipment is designed to operate optimally and efficiently under a standard load. Rated speed reflects the speed at which the equipment achieves its intended performance, particularly in terms of efficiency and durability. Rated power, on the other hand, is the maximum power that the motor or equipment can deliver continuously during normal operation without risk of damage or reduced life.

Conventional systems assume that the motor can consistently deliver its rated power regardless of speed. In practice, however, the motor may not be able to maintain its rated power beyond the rated speed. As a result, the actual speed of a motor under load does not match the speed calculated with such an assumption.

It is therefore necessary to be able to accurately determine the maximum speed that can be reached when the motor is subjected to a defined load, i.e., a defined torque, even at high operating speeds, i.e., in particular when the motor speed is higher than its rated speed.

To that aim, the present disclosure concerns method of determining a maximum operating speed of an electric motor subjected to a defined torque, at a speed higher than the rated speed of the motor, comprising:

- operating the motor at its maximum speed, for different torque values, and determining, for each torque value, the corresponding maximum motor speed, to obtain a set of actual measurement points representing the evolution of the maximum motor speed as a function of the torque applied to the motor,
- selecting a coefficient COF between 0 and 1, for example depending on the motor characteristics,
- determining a first curve representing the evolution of the maximum speed $\Omega_{ref}$ as a function of the measured torque $T_{meas}$ corresponding to the actual measurement points, for low maximum speeds, said first curve being defined by $$\Omega_{ref} = \frac{COF * P_{nom}}{T_{meas}},$$

where $\Omega_{ref}$ is the maximum speed, $P_{nom}$ is the rated power and $T_{meas}$ is the measured torque of the motor,

- defining a limit torque $T_{lim}$ corresponding to the torque at the intersection of the first curve with the set of measurement points,
- determining a second curve representing the evolution of the maximum speed $\Omega_{ref}$ as a function of the measured torque $T_{meas}$, corresponding to the actual measurement points, for measured torques $T_{meas}$ lower than $T_{lim}$ said second curve being defined by $$\Omega_{ref} = \frac{COF * P_{nom}}{f(T_{meas})}$$

where $f$ is a polynomial function, said function $f$ being determined from the measurement points,

- determining, from a defined torque T, the corresponding maximum motor speed, from the equation of the first curve if $T \geq T_{lim}$ from the equation of the second curve if $T \leq T_{lim}$.

The maximum operating speed of an electric motor refers to the highest speed at which the motor can operate safely and effectively under specific conditions, including different loads or torques. Unlike the rated speed, which is the optimum speed of the motor under standard load conditions, the maximum operating speed can vary depending on factors such as the applied load, motor design and operating conditions. In practical applications, particularly in scenarios such as high speed hoisting, this speed is critical as it determines the ability of the motor to handle higher than normal speeds and loads, directly affecting the efficiency and effectiveness of the performance in demanding situations.

The defined torque of an electric motor refers to a specific amount or value of rotational force that the motor is expected to produce or handle under certain conditions. Torque is a characteristic of motor performance that refers to the force a motor can apply to rotate an object or system.

The relationship between torque, speed, and power can be expressed by the formula: Power=Torque*Speed. The classic unit for torque is the Newton-meter (Nm). The speed is typically measured in revolutions per minute (RPM). The classic unit for power is watts (W). The formula to calculate power in an electric motor, considering these units:

$$\text{Power } (W) = \text{Torque } (Nm) \times \text{Speed } (RPM) \times \frac{2\pi}{60}.$$

The factor $$\frac{2\pi}{60}$$

is used to convert the rotational speed from RPM to radians per second, which aligns the units for calculating power in watts.

In the above-mentioned formula $$\Omega_{ref} = \frac{COF * P_{nom}}{T_{meas}},$$

the speed $\Omega_{ref}$ is expressed in radians per seconds (rad/s), the power $P_{nom}$ is expressed in watts (W) and the torque $T_{meas}$ is expressed in Newton-meters (Nm).

The actual measurement points refer to specific data points collected from real-world testing or operation of an electric motor. Said actual measurement points illustrate how the maximum speed of the motor changes in response to different levels of applied torque. These measurement points are gathered by subjecting the motor to varying torque conditions and observing the corresponding speeds attained. This data is useful for understanding the performance characteristics, especially its ability to maintain or reach certain speeds under varying loads. The relationship between torque and speed, as captured by these measurements, helps in constructing a detailed and practical performance profile of the motor, which may be used for designing efficient and reliable motor-driven systems, particularly in applications where precise control of speed and torque is required.

The motor characteristics refer to the specific properties and performance parameters of an electric motor that define its operational capabilities and efficiency. These characteristics may include the rated power and speed of the motor, torque-speed curve, efficiency, power factor, starting torque, and thermal limits, among others. They determine how the motor behaves under various load conditions, its power consumption, and overall suitability for specific applications. Motor characteristics may be provided by the manufacturer of the motor.

The determination of the first curve may take into account the actual measurement points for low maximum speed, i.e. for a maximum speed $\Omega_{ref}$ that is below a defined value.

Once the first curve is determined, a limit torque $T_{lim}$ corresponding to the torque at the intersection of the first curve with the set of measurement points is defined.

This can be achieved, for example, by interpolating or regressing the measurement points to obtain a curve, called describing curve, describing the evolution of the actual measurement points and by determining the intersection of the first curve and the describing curve.

Interpolation involves creating a curve or a function that passes exactly through all the given data points. It assumes the data is sufficiently accurate and seeks to produce values that are consistent with the given set.

Such interpolation may be linear or polynomial, for example. Linear interpolation is the simplest form of interpolation and involves drawing a straight line between two known data points and using this line to estimate the values between these points. Polynomial interpolation is a more complex method where a polynomial (degree 2 or higher) is fitted to the data, enabling better estimation in cases where the relationship between the points is not linear.

In regression analysis, the fitted line or curve represents the best estimate of the relationship between the variables, minimizing the overall error or distance between the data points and the line or curve. Regression may be linear or polynomial, for example.

Alternatively, the intersection can be estimated from the sole measurement points, without determining a describing curve fitting these points, for example by choosing one of the actual measurement points as the intersection point. This implies an approximation, which is acceptable in the present process.

Said function $f$ may be a polynomial function, for example a first order polynomial function or a second order polynomial function.

Said function $f$ may be a function defining a Bézier curve.

A function defining a Bézier curve is a mathematical representation used to model smooth curves that can be scaled and manipulated easily. The basic idea behind a Bézier curve is to use a set of control points to define the curve's shape. The function uses these control points to create a parametric curve that is smooth and continuous. The function for a Bézier curve is a polynomial function, where the degree of the polynomial is one less than the number of control points. For instance, a cubic Bézier curve has a third-degree polynomial.

In a Bézier curve, the curve itself does not usually pass through the intermediate control points. These points act more like magnets pulling the curve in certain directions, thereby shaping it.

Said method may further comprises:

determining an initial torque $T_0$ from which the maximum speed $\Omega_{ref}$ of the motor decreases, said maximum speed being constant when the torque applied to the motor is less than said initial torque, defining the maximum motor speed $\Omega_{ref}$ subjected to said defined torque being equal to a constant maximum value $\Omega_{max}$ if said defined torque $T \leq T_0$.

In other words, for a defined torque T, the corresponding maximum speed can be determined by the following equations:

$$\Omega = \frac{COF * P_{nom}}{T} \text{ if } T \geq T_{lim}$$

$$\Omega = \frac{COF * P_{nom}}{a * T + b} \text{ if } T_0 \leq T \leq T_{lim}$$

with the above-mentioned function $f$ (first order polynomial function), $$\Omega = \Omega_{max} \text{ if } T \leq T_0.$$

In any cases, $\Omega$ may be bounded by (i.e. may not exceed) $\Omega_{max}$.

The present disclosure also concerns a computer program comprising instructions for implementing the above-mentioned method when this program is executed by a processor.

The present disclosure also concerns a non-transitory computer-readable recording medium on which is recorded a program for implementing the above-mentioned method, when this program is executed by a processor.

BRIEF DESCRIPTION OF THE DRAWINGS

Further features, details and advantages will become apparent from the detailed description below, and from an analysis of the appended drawings, in which.

DESCRIPTION OF EMBODIMENTS

Figure 1:
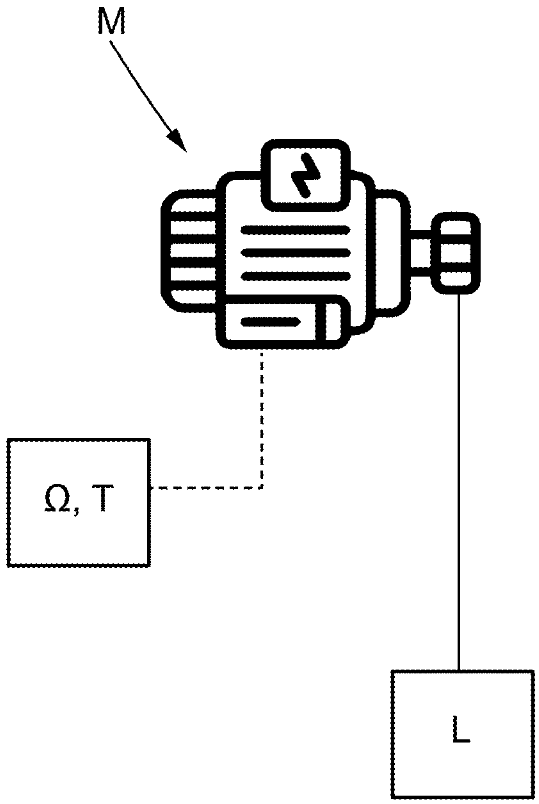
FIG. 1 schematically illustrates a lifting device comprising an electric motor subjected to a load, FIG. 2 schematically illustrates the various stages of the process described herein.

FIG. 1 shows a lifting device for a crane, for example, comprising a load-bearing electric motor. The motor comprises a stator and a rotor coupled to a shaft, the rotation of the shaft moving the load. The speed at which the load is moved is linked to the speed of rotation of the motor shaft, also known as the motor speed. Thus, during operation, the motor is subjected to a torque whose value depends on the load to be moved.

Figure 2:
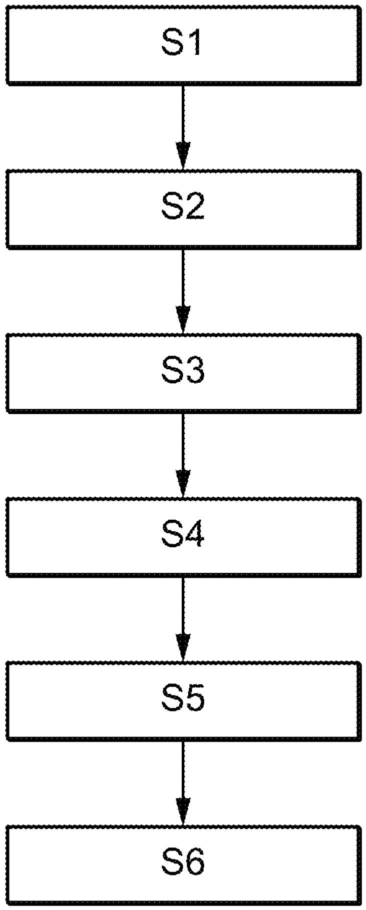

FIG. 2 schematically illustrates a method of determining a maximum operating speed of an electric motor subjected to a defined torque, at a speed higher than the rated speed of the motor.

Figure 3:
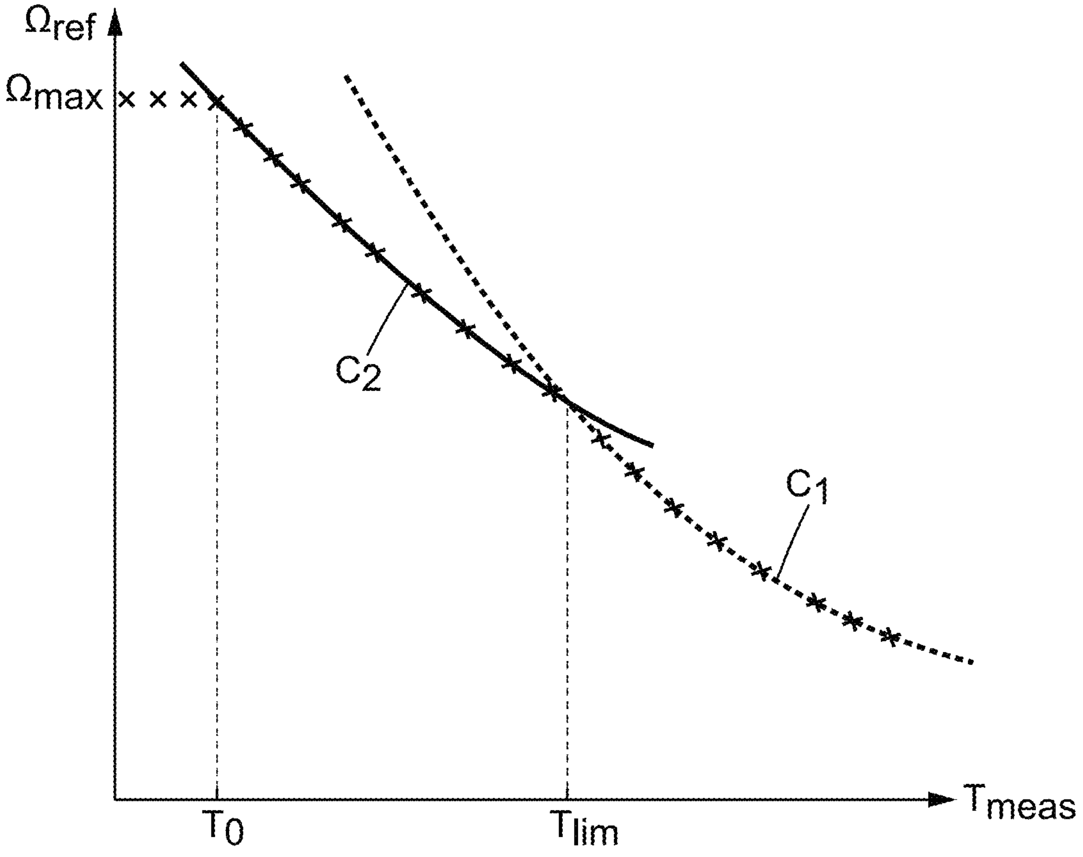
FIG. 3 is a diagram showing the evolution of the maximum speed of an electric motor as a function of the torque to which the motor is subjected.

FIG. 3 illustrate the evolution of the maximum speed of a motor as a function of the torque applied to the motor. More particularly, the evolution is represented by a series of measurement points gathered from experiments conducted on a lifting device or a test bench, both incorporating a motor to which a load has been applied. This figure provides a detailed view of how the maximum speed of the motor varies in response to different levels of torque.

This variation in maximum speed reveals three distinct zones, a first zone ($T_{meas} \leq T_0$) where maximum speed is essentially constant and equal to $\Omega_{max}$, a second zone ($T_0 \leq T_{meas} \leq T_{lim}$) where speed decreases with torque, and a third zone ($T_{meas} \geq T_{lim}$) where speed also decreases with torque, but more rapidly than in the second zone.

In the proposed method, the motor is operated at its maximum speed (S1 in FIG. 3), for different torque values (i.e., with different loads), and, for each torque value, the corresponding maximum motor speed is determined, to obtain a set of real measurement points representing the evolution of the maximum motor speed as a function of the torque applied to the motor.

To that aim, the load may be progressively increased or decreased, per increment for example. The torque applied to the motor and the maximum speed may be measured or determined directly or indirectly, for example by calculation from another measurement.

Then a coefficient COF between 0 and 1 selected, for example depending on the motor characteristics (S2).

A first curve $C_1$ representing the evolution of the maximum speed $\Omega_{ref}$ as a function of the measured torque $T_{meas}$ corresponding to the actual measurement points, may then be determined for low maximum speeds (S3). Said first curve may be defined by $$\Omega_{ref} = \frac{COF * P_{nom}}{T_{meas}},$$

where $\Omega_{ref}$ is the maximum speed, $P_{nom}$ is the rated power and $T_{meas}$ is the measured torque of the motor.

A limit torque $T_{lim}$ corresponding to the torque at the intersection of the first curve with the set of measurement points may then be determined (S4).

Then, a second curve $C_2$ may be determined (S5), said second curve representing the evolution of the maximum speed $\Omega_{ref}$ as a function of the measured torque $T_{meas}$, corresponding to the actual measurement points, for measured torques $T_{meas}$ comprised between $T_0$ than $T_{lim}$ said second curve being defined by $$\Omega_{ref} = \frac{COF * P_{nom}}{f(T_{meas})}$$

where $f$ is a polynomial function, said function $f$ being determined from the measurement points.

Said function $f$ is a polynomial function, for example a first order polynomial function.

In such case, the equation $$\Omega_{ref} = \frac{COF * P_{nom}}{f(T_{meas})}$$

can be read $$\Omega_{ref} = \frac{COF * P_{nom}}{(a * T_{meas} + b)},$$

where a and b are scalars. In this case, in order to determine the second curve, it is first necessary to determine the values of the scalars a and b.

For this purpose, one option may be to solve a system of two equations with two unknowns by choosing two measurement points defined by the coordinates ($\Omega_{ref1}$; $T_{meas1}$) and ($\Omega_{ref2}$; $T_{meas2}$), the equations can then be defined as follows:

$$\Omega_{ref1} = \frac{COF * P_{nom}}{(a * T_{meas1} + b)} \quad \text{(Equation 1)}$$

$$\Omega_{ref2} = \frac{COF * P_{nom}}{(a * T_{meas2} + b)} \quad \text{(Equation 2)}$$

The values $\Omega_{ref1}$, $T_{meas1}$, $\Omega_{ref2}$, $T_{meas2}$, COF et $P_{nom}$ being known, a and b can be determined.

Alternatively, a and b can be determined by the following equations:

$$\begin{cases} \mu = \min\left(\max\left(\frac{COF * FRS}{\Omega_{max} * (T_{lim} - T_0)} - \frac{T_0}{T_{lim} - T_0}, 0\right), 1\right) \\ a = (1 - \mu) \\ b = \mu * T_{lim} \end{cases}$$

where FRS is the rated frequency of the motor. The rated frequency of a motor refers to the specific frequency at which the motor is designed to operate most efficiently and effectively. This frequency is typically specified by the manufacturer (for example on the motor nameplate) and is closely tied to the electrical power supply standards of the region where the motor is intended to be used.

Then, the corresponding maximum motor speed may be determined (S6), from a defined torque T, from the equation of the first curve if $T \geq T_{lim}$ and from the equation of the second curve if $T_0 \leq T \leq T_{lim}$.

In other words, for a defined torque T, the corresponding maximum speed can be determined by the following equations:

$$\Omega = \frac{COF * P_{nom}}{T} \text{ if } T \geq T_{lim}$$

$$\Omega = \frac{COF * P_{nom}}{a * T + b} \text{ if } T_0 \leq T \leq T_{lim}$$

with the above-mentioned function $f$ (first order polynomial function), $$\Omega = \Omega_{max} \text{ if } T \le T_0.$$

The invention claimed is:

1. A method of determining a maximum operating speed of an electric motor subjected to a defined torque, at a speed higher than a rated speed of the electric motor, comprising:

operating the electric motor at its maximum speed, for different torque values, and determining, for each torque value, a corresponding maximum motor speed, to obtain a set of real measurement points representing an evolution of the maximum motor speed as a function of the torque applied to the motor;

selecting a coefficient COF between 0 and 1;

determining a first curve representing the evolution of the maximum speed $\Omega_{ref}$ as a function of a measured torque Tmeas corresponding to actual measurement points, for low maximum speeds, said first curve being defined by an equation $$\Omega_{ref} = \frac{COF * P_{nom}}{T_{meas}},$$

where $\Omega_{ref}$ is the maximum speed, $P_{nom}$ is a rated power and Tmeas is the measured torque of the motor;

defining a limit torque $T_{lim}$ corresponding to a torque at an intersection of the first curve with the set of measurement points;

determining a second curve representing the evolution of the maximum speed $\Omega_{ref}$ as a function of the measured torque Tmeas, corresponding to the actual measurement points, for measured torques Tmeas lower than $T_{lim}$ said second curve being defined by an equation $$\Omega_{ref} = \frac{COF * P_{nom}}{f(T_{meas})}$$

where $f$ is a polynomial function, said function $f$ being determined from the measurement points; and determining, from a defined torque T, the corresponding maximum motor speed, from the equation of the first curve if $T \ge T_{lim}$ and from the equation of the second curve if $T \le T_{lim}$.

2. The method according to claim 1, wherein said function $f$ is a function defining a Bézier curve.

3. The method according to claim 1, wherein said method further comprises:

determining an initial torque $T_0$ from which the maximum speed $\Omega_{ref}$ of the motor decreases, said maximum speed being constant when the torque applied to the motor is less than said initial torque; and defining the maximum motor speed $\Omega_{ref}$ subjected to said defined torque being equal to a constant maximum value $\Omega_{max}$ if said defined torque $T \le T_0$.

4. A non-transitory computer-readable recording medium on which is recorded a computer program comprising instructions for implementing a method of determining a maximum operating speed of an electric motor subjected to a defined torque, at a speed higher than a rated speed of the motor, the method comprising:

operating the motor at its maximum speed, for different torque values, and determining, for each torque value, a corresponding maximum motor speed, to obtain a set of real measurement points representing an evolution of the maximum motor speed as a function of the torque applied to the motor;

selecting a coefficient COF between 0 and 1;

determining a first curve representing the evolution of the maximum speed $\Omega_{ref}$ as a function of a measured torque Tmeas corresponding to actual measurement points, for low maximum speeds, said first curve being defined by an equation $$\Omega_{ref} = \frac{COF * P_{nom}}{T_{meas}},$$

where $\Omega_{ref}$ is the maximum speed, $P_{nom}$ is a rated power and Tmeas is the measured torque of the motor;

defining a limit torque $T_{lim}$ corresponding to a torque at an intersection of the first curve with the set of measurement points;

determining a second curve representing the evolution of the maximum speed $\Omega_{ref}$ as a function of the measured torque Tmeas, corresponding to the actual measurement points, for measured torques Tmeas lower than $T_{lim}$ said second curve being defined by an equation $$\Omega_{ref} = \frac{COF * P_{nom}}{f(T_{meas})}$$

where $f$ is a polynomial function, said function $f$ being determined from the measurement points; and determining, from a defined torque T, the corresponding maximum motor speed, from the equation of the first curve if $T \ge T_{lim}$ and from the equation of the second curve if $T \le T_{lim}$.

* * * * *